United States Patent

Kilovsky et al.

(10) Patent No.: US 6,548,783 B1
(45) Date of Patent: Apr. 15, 2003

(54) APPARATUS FOR ELECTRIC ARC OVERLAY WELDING

(75) Inventors: Victor Kilovsky, Orland Park, KS (US); Warren Moss, Archie, MO (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 09/970,116

(22) Filed: Oct. 3, 2001

(51) Int. Cl.[7] .............................................. B23K 9/12
(52) U.S. Cl. ........................ 219/125.1; 219/76.14; 219/125.12; 219/130.01; 219/130.21
(58) Field of Search .................... 219/125.1, 76.14, 219/124.34, 125.12, 130.01, 130.21, 137 PS (56) References Cited

U.S. PATENT DOCUMENTS

| | | | |
|---|---|---|---|
| 3,515,844 A | * 6/1970 | Colarossi et al. ....... | 219/125.12 |
| 3,602,687 A | * 8/1971 | Pollock ................ | 219/137 PS |
| 3,681,564 A | * 8/1972 | Hiyama et al. ......... | 219/125.12 |
| 4,019,016 A | 4/1977 | Friedman et al. ... | 219/125.12 R |
| 4,384,188 A | 5/1983 | Wright, Jr. ........... | 219/130.51 |
| 4,631,385 A | 12/1986 | Rothermel ............ | 219/124.03 |
| 4,959,523 A | * 9/1990 | Fihey et al. ............ | 219/125.1 |
| 5,070,792 A | 12/1991 | Harris ................. | 105/29.1 |
| 5,220,145 A | 6/1993 | Cecil et al. ............ | 219/110 |
| 5,571,431 A | * 11/1996 | Lantieri et al. ....... | 219/130.01 |
| 5,932,123 A | * 8/1999 | Marhofer et al. ...... | 219/125.12 |

* cited by examiner

Primary Examiner—Clifford C. Shaw
(74) Attorney, Agent, or Firm—Ernest Cusick; Gary M. Hartman; Domenica N. S. Hartman (57) ABSTRACT

An arc welding overlay apparatus that comprises a welding head carriage adapted for movement on a track, an index arm mounted for movement in a direction substantially transverse to the track, a slide mounted for movement in a direction substantially transverse to the index arm, a welding torch mounted to the slide, and means for dispensing a filler material to the welding torch. Feedback means and control means cooperate to indicate and control the movement of the weld head carriage, index arm, electric arc length and the filler dispensing rate. Means are also provided for emergency shutdown of the electric power source.

20 Claims, 4 Drawing Sheets

APPARATUS FOR ELECTRIC ARC OVERLAY WELDING

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

The present invention generally relates to welding equipment and processes. More particularly, this invention relates to an arc-welding overlay apparatus having improved integration, reliability and ease of use, and capable of producing quality welds under harsh conditions.

(2) Description of the Related Art

Overlay welding generally involves depositing weld material over a surface region in a series of beads with some lateral overlapping, forming a continuous layer of weld material that increases the thickness and strength of the region. Overlay welds are often deposited by shielded metal-arc welding in the restoration of large vessels used in industries such as utilities, co-generation refining, petrochemical, pulp and paper, and waste-to-energy. A particular use of overlay welds is in the repair of boiler panels, though overlay welding is also useful in repairing individual boiler tubes, smaller pressure vessels, nozzles and pipe sections of a boiler. Overlay weld material can be deposited manually or with the use of an automatic or semiautomatic welding machine mounted in the vicinity of the region being welded.

Accuracy and consistency of all parameters are critical during an overlay welding process, which can be difficult to achieve if the overlay welding equipment must perform in a harsh environment. Welding defects that can occur include cold laps on weld overlay starts and stops, burn-throughs, and overlay deposited with improper shielding gas pressure (necessitating removal and re-application of the weld). There is also the difficulty of tying two sections of overlay together with minimal or no preparation work to the overlay sections being tied. A variety of machine overlay welding equipment has been developed, such as U.S. Pat. Nos. 4,019,016, 4,631,385, 5,070,792 and 5,220,145. These and other commercially-available machine overlay welding equipment may make use of variable speed travel carriages and modular drive systems. However, such equipment has not been found to meet the rigors of the environment in which weld repairs of boilers must be performed. Existing welding equipment also have a limited level of integration that cannot satisfy a variety of repair applications of the type associated with the restoration of boilers and their associated components.

In view of the above, it would be desirable if an improved overlay welding apparatus were available for performing weld repairs, particularly in demanding applications.

BRIEF SUMMARY OF THE INVENTION

The present invention provides an overlay welding apparatus that is capable of increasing the accuracy and consistency of essentially all welding parameters, such that a more consistent overlay repair can be obtained even in a harsh repair environment. More particularly, the invention is an electric-arc welding overlay apparatus with improvements over the prior art that render the apparatus capable of greater mechanical weld head stability, and provides external oscillator stroke adjustment and electronic circuitry that control movement of the arc along the desired weld path. The overlay welding apparatus of this invention also provides for the control of the welding current, carriage speed, wire feed speed and oscillation speed so as to reduce the incidence of cold laps on weld overlay starts and stops, burn-throughs, and overlay deposited with improper shielding gas pressure.

The above features of the invention are provided with an arc welding overlay apparatus that comprises an electric power source for producing a welding current, a track on which a welding head carriage is adapted for movement, an index arm mounted for movement in a direction substantially transverse to the track, a slide mounted for movement in a direction substantially transverse to the index arm, a welding torch mounted to the slide by which the welding current maintains an electric arc with a workpiece, and means for dispensing a filler material to the welding torch. The welding apparatus is further equipped with means for providing feedback signals that sense the travel speed of the weld head carriage on the track, the transverse movement of the index arm, the length of the electric arc produced by the welding torch, and the rate at which filler material is dispensed by the dispensing means. Control means are provided to operate on the basis of these feedback signals to control the travel speed of the weld head carriage, the transverse movement of the index arm, the length of the electric arc, and the rate at which the filler material is dispensed.

The welding apparatus also preferably includes means for delivering a shielding gas to the welding torch, and means for sensing the delivery of the shielding gas by the delivering means so that adequate shielding gas flow is maintained. In addition, the welding apparatus preferably includes means for oscillating the welding torch relative to the index arm. Additional preferred aspects of the welding apparatus of this invention include a modular design for ease of maintenance, and the ability to step or ramp all control parameters up and down, adjust stick-out (electrode extension), and monitor and record control parameters at predetermined intervals for later inspection to evaluate weld quality. Another preferred aspect is the capability for automatic emergency shutdown during shielding gas or carriage speed failures.

The invention utilizes the above improvements and preferred aspects to provide a universal welding system that is highly integrated and reliable compared to overlay welding apparatuses of the prior art, yet is sufficiently uncomplicated to be used by operators with limited experience. In addition, the overlay welding apparatus can be employed in a wider variety of applications than prior art apparatuses, with the capability of producing quality welds under harsh conditions.

Other objects and advantages of this invention will be better appreciated from the following detailed description.

DETAILED DESCRIPTION OF THE INVENTION

Figure 1:
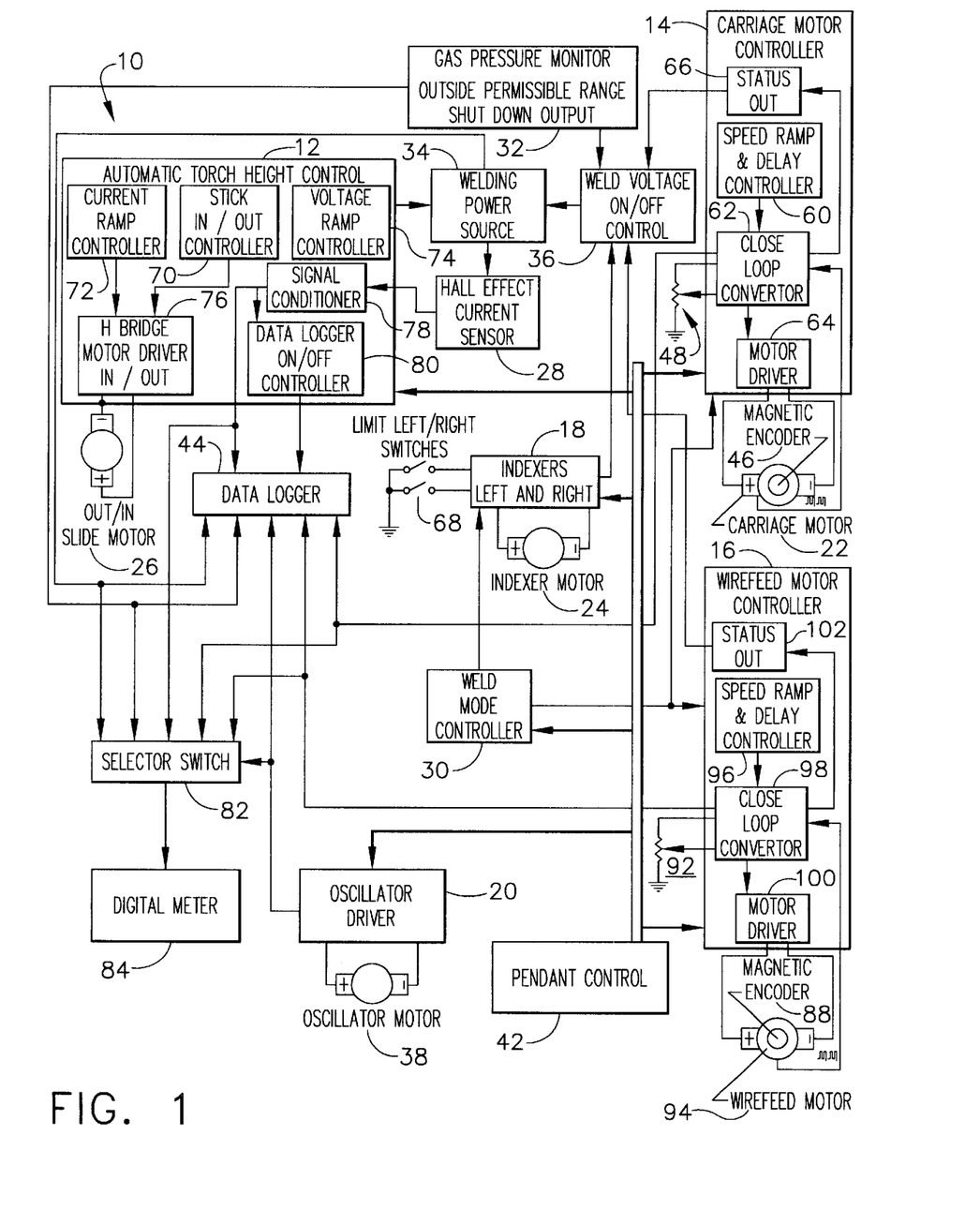
FIG. 1 is a block diagram of a control system for an arc-welding overlay apparatus in accordance with a preferred embodiment of the present invention.
Figure 2:
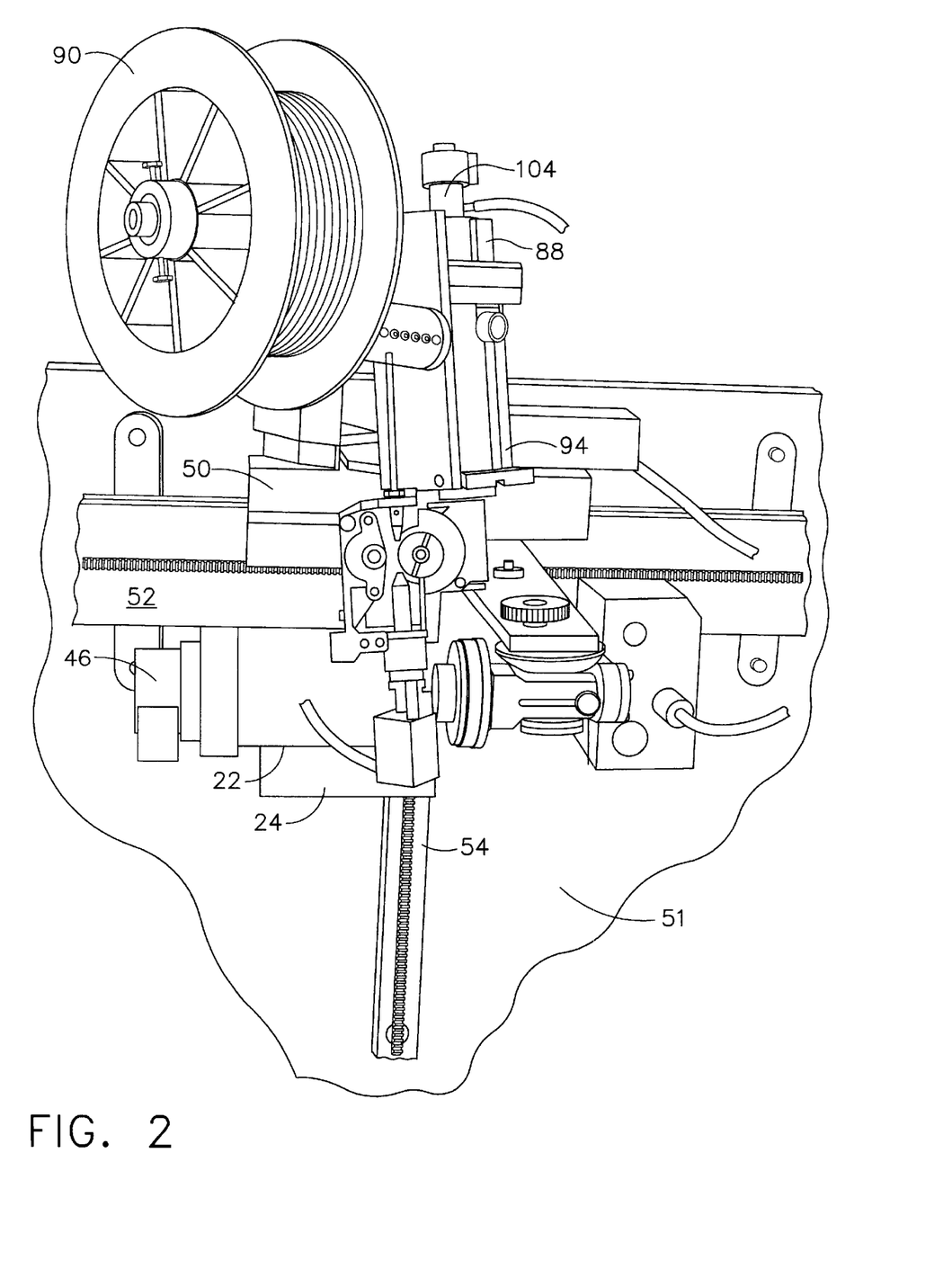
FIGS. 2 and 3 represent a weld head carriage assembly and a weld head assembly, respectively, of the overlay apparatus.
Figure 3:
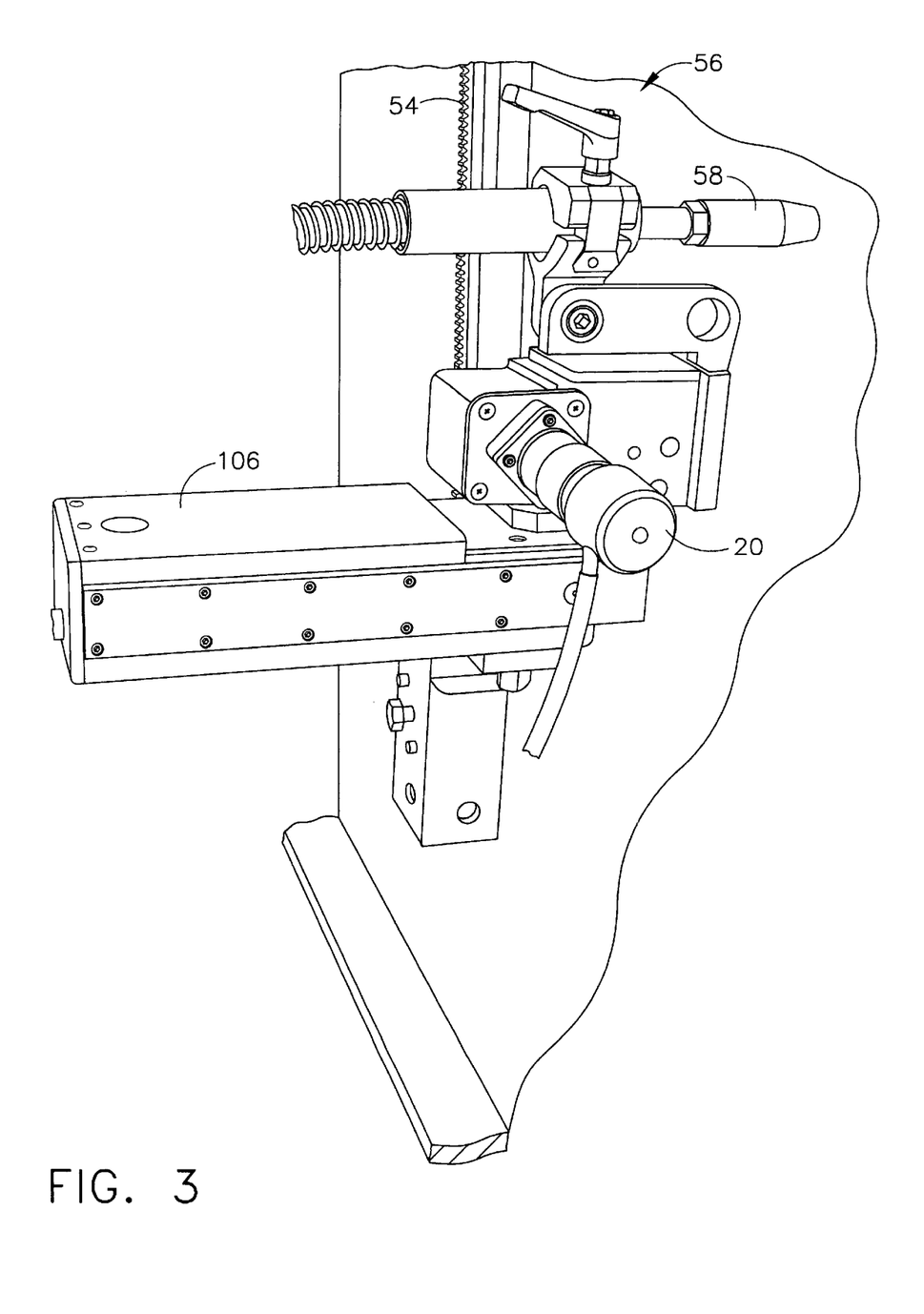
Figure 4:
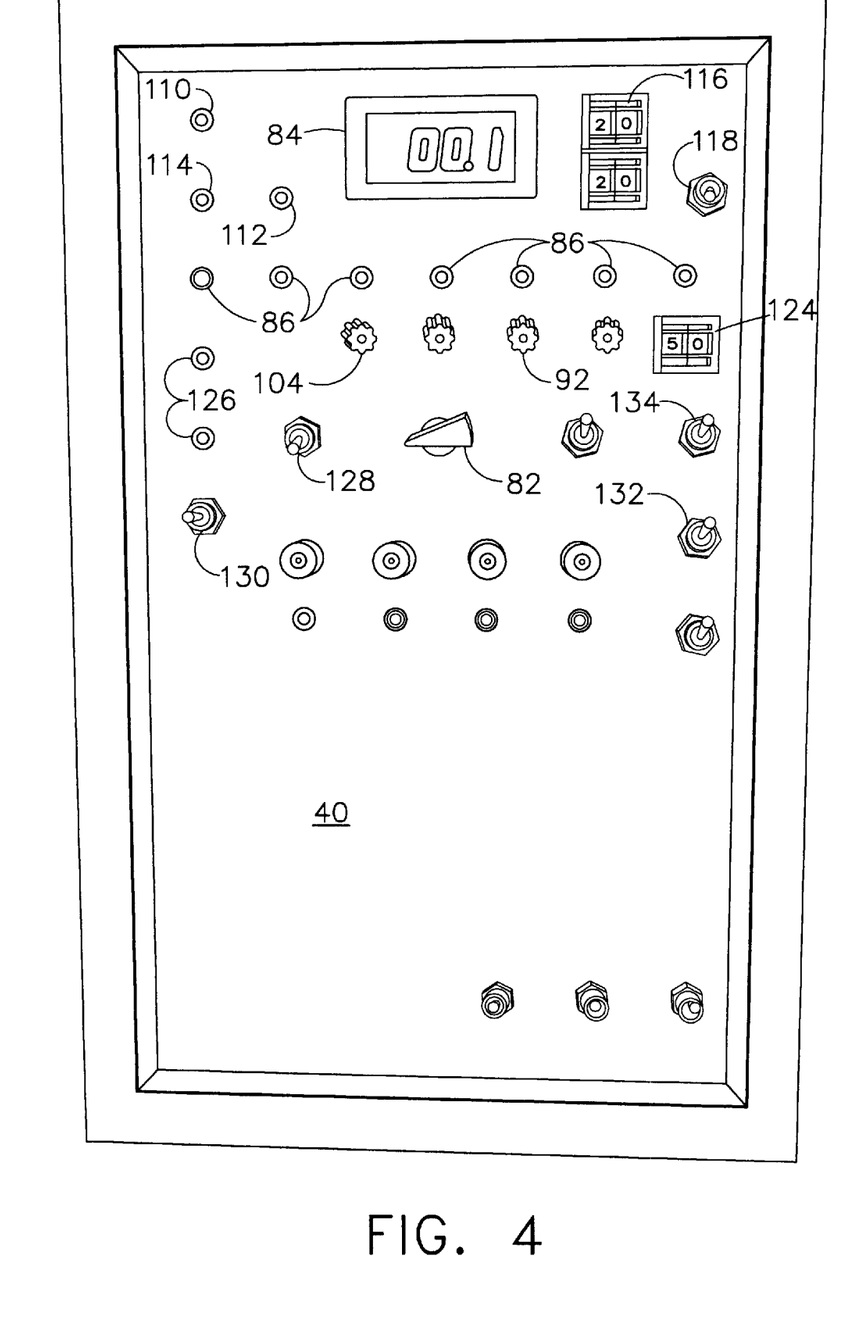
FIG. 4 represents a control panel for the overlay apparatus.

FIG. 1 schematically illustrates a control system 10 for an electric arc overlay welding apparatus, while various components of the apparatus are represented in FIGS. 2 through 4 in accordance with a preferred embodiment of the invention. The control system 10 is represented as including a programmable automatic torch height controller 12, a carriage motor controller 14, a wire feed motor controller 16, and an index motor controller 18. The carriage motor controller 14 controls a carriage motor 22, which is shown in FIG. 2 as causing a weld head carriage 50 mounted to a track 52. The track 52 is mounted to a workpiece 51 in a known manner, such that the carriage 50 moves on the track 52 in the direction of an intended weld path on the workpiece 51. The carriage 50 is shown as carrying various modular components of the welding apparatus, including the carriage motor 22 and associated magnetic encoder 46, an index motor 24, an index arm 54, a wire feed motor 94 and associated magnetic encoder 88, and a gas valve 104.

The index arm 54 is seen in FIG. 2 as extending from the carriage 50 in a direction transverse to the track 52 (and therefore transverse to the weld path). The end of the index arm 54 is shown in FIG. 3 as supporting a weld head assembly 56, which includes an oscillator driver 20, welding torch 58 and torch height slide 106. The welding torch 58 may be of any suitable metal-arc type, though the use of a wire filler material (hence, the wire feed motor controller 16) and shielding gas is preferred. As known in the art, the wire feed motor controller 16 regulates the wire feed speed to a desired value, depending on the material, diameter, etc., of the weld wire used. Shielding gas is routed to the welding torch 58 via a gas valve 104, shown in FIG. 2 as mounted on the carriage 50. The index motor controller 18 controls an index motor 24 (FIGS. 1 and 2) to cause the index arm 54, and therefore the weld head assembly 56 and welding torch 58 mounted thereto, to move transverse to the weld path direction.

The torch height controller 12 controls a slide motor 26 of a slide assembly 106 (FIG. 2) to establish the distance of the welding torch 58 from the surface of the workpiece 51. As such, the slide motor 26 and assembly 106 operate to maintain a constant arc length as the torch 58 passes over any surface irregularities in the workpiece 51, thereby maintaining a substantially constant voltage drop. FIG. 1 also schematically represents the control system 10 as including an oscillator driver 20, a weld mode controller 30, a gas pressure monitor 32, a welding power source 34, and a weld voltage ON/OFF control 36, all of which will be discussed below.

The electronic components and circuitry for the above systems are preferably housed within a control panel 40 shown in FIG. 4. The control panel 40 is shown as having various input devices, including a selector switch 82, a digital meter 84, potentiometers 92, 104, 120 and 122, and a row of LED's 86 to allow an operator to visually check all parameter settings and adjust them as necessary during the weld overlay process. The welding apparatus of this invention also preferably includes a pendant control unit 42 schematically represented in FIG. 1. The pendant control unit 42 is preferably suspended to be accessible to an operator standing near the workpiece 51 being welded with the apparatus.

The welding power source 34 provides the welding current to the torch 58. The power source 34 is a pulsed power source and preferably capable of delivering direct or alternating current, depending on the welding process, the wire (filler) material, the type of shielding used, the material of the workpiece 51 being welded, etc. The power source 34 is shown in FIG. 1 as being controlled by the weld voltage ON/OFF control 36, which enables the welding current to be quickly terminated under certain conditions, as discussed further below. Additional controls for the power source 34 include potentiometers 120 and 122 for manually adjusting the voltage and amperage, respectively, of the power source 34.

The carriage motor controller 14 of FIG. 1 utilizes feedback from a magnetic encoder 46 (FIGS. 1 and 2) to regulate the travel speed of the weld head carriage 50 to a desired value that is programmed with a potentiometer 48 (FIG. 1) whose control knob (not shown) is located on the pendant control unit 42. The potentiometer 48 can be overridden with a switch 134 on the control panel 40 that causes the carriage 50 to rapidly retract. The motor controller 14 is represented in FIG. 1 as comprising a speed and delay controller 60, a close loop converter 62, a motor driver 64 and status out unit 66 that communicates with the weld voltage ON/OFF control 36. The speed and delay controller 60 enables the speed of the carriage 50 to be changed and delays set to desired values on the basis of the welding current, the feed rate of the welding wire, and the weld wire material. The controller 60 is also useful during each new sequence in which two sections of overlay or build-up are tied together without first preparing the workpiece surface. In particular, the controller 60 contains data for programming suitable speeds and delays for the carriage 50, so that each pass of the torch 58 can be initiated without the occurrence of cold fusion or lap. In a preferred embodiment, the carriage 50 is initially delayed from movement down the track 52, after which the carriage speed is stepped up to cause the carriage 50 to travel rapidly on the track 52 for about one-half second, and then stepped down to an acceptable travel speed for the balance of the weld cycle. As will be discussed below, the speed and delay controller 60 works in combination with other controllers of the system 10 to avoid the occurrence of cold fusion.

The close loop converter 62 utilizes the feedback from the carriage motor magnetic encoder 46 to regulate the speed of the carriage 50 to the desired value programmed with the potentiometer 48. In a working embodiment of the invention, the output of the motor driver 64 to the carriage motor 22 is preferably limited to a maximum of 90 VDC at 15 amperes and is short-circuit protected. Travel "ON/OFF" and direction switches (not shown) for the carriage motor 22 are preferably located on the pendant control unit 42. Though not shown in FIG. 1, two carriage motors 22 may be used in parallel to eliminate the effect of gear backlash with the track 52 when the carriage 50 reverses its travel direction on the track 52.

The status output unit 66 continuously detects the movement of the carriage 50 through the close loop converter 62, and relays this information to the weld voltage ON/OFF control 36. If travel speed is below a preset lower limit to the desired speed, the status output unit 66 sends an "OFF" signal to the ON/OFF control 36, which in turn shuts down the welding power source 34 to prevent burn-through.

The index motor controller 18 causes the index motor 24 to move the index arm 54 (FIG. 2) with the welding torch 58 (FIG. 3) in a direction transverse to the weld path being followed by the weld head carriage 50. The control panel 40 is shown as providing two potentiometers 116 for adjusting the timing of the index cycle, and a switch 118 for manually changing the direction of indexer travel. The extreme limits for the travel of the welding torch 58 along the weld path are set by limit switches 68 located on the weld head assembly 56 or by a switch on the pendant control unit 42. In a typical welding cycle, the carriage motor 22 causes the carriage 50 to travel the track 52 until one of the limit switches 68 is tripped, upon which the index motor controller 18 causes the index motor 24 to move the index arm 54, and therefore the torch 58, a predetermined distance toward or away from the track 52. After the index sequence, the carriage 50 reverses its travel direction on the track 52, such that a bead is formed with some lateral overlap with the immediately preceding bead.

As noted above, the torch height controller 12 operates the slide motor 26 to establish the distance of the welding torch 58 from the surface of the workpiece 51. The controller 12 preferably provides precise control of the distance between the torch 58 and workpiece 51 by sensing the welding current, such as with a hall effect current sensor 28 (FIG. 1). However, the torch height controller 12 could make use of a variety of other sensors, such as a temperature sensor or a laser or ultrasound distance sensor. In any event, the torch height controller 12 is preferably capable of achieving and maintaining a suitable arc current by maintaining an extremely accurate arc length, e.g., within 0.5% of a preselected arc length range. The controller 12 preferably provides pulse-width modulated control of speed of the slide motor 26 with infinite adjustment. A stick "IN/OUT" controller 70 and current controller 72 establish the position of the torch 58 through an IN/OUT motor driver 76, while a voltage controller 74 controls the welding power source 34 to ensure a "hot start" after each welding pass. A signal conditioner 78 communicates with the current sensor 28 and sends the output of the sensor 28 to a data logger 44, discussed below. The signal conditioner 78 preferably employs a suitable signal filtering technique to render the conditioner 78 adaptable to any constant voltage or pulsed welding machines, i.e., the signal conditioner 78 ignores high frequency DC current pulses so that the torch 58 does not move in and out with a pulsed weld current. Finally, the torch height controller 12 includes a data logger ON/OFF controller 80, which triggers the data logger 44 to operate after the welding current from the power source 34 reaches a predetermined level. The control panel 4 (FIG. 4) is shown as being equipped with a dial 124 for manually setting the slide motor speed, a pair of LED's 126 that indicate slide movement direction, and a switch 132 that enables torch height control to be controlled manually or automatically through the torch height controller 12.

The oscillator driver 20 noted above drives an oscillator motor 38. According to known practice, the oscillator driver 20 controls an oscillator motor 38 to oscillate the welding torch 58 in a direction parallel to the weld bead, i.e., parallel to the travel of the weld head carriage 50 along the track 52. Controls (not shown) for adjusting the oscillation width and stall are preferably mounted directly on the driver 20. The oscillator driver 20 utilizes a potentiometer 104 (FIG. 4) calibrated in strokes per minute to regulate the speed of the oscillator motor 38. An ON/OFF switch (not shown) is preferably provided on the pendant control unit 42 to allow an operator to visually check the oscillation width and the end points prior to starting the welding cycle. The driver 20 is preferably fully short-circuit protected, and its output is preferably limited to a maximum of about 30 VDC at 1.5 amperes.

The gas pressure monitor 32 continuously senses shielding gas pressure (if used) to determine whether an adequate shielding gas flow is present at the welding torch 58, and automatically shuts down the welding power source 34 via the ON/OFF control 36 if the shielding gas pressure is outside a predetermined acceptable range. The control panel 40 is shown as having a switch 130 with which shielding gas flow can be manually turned on and off. The panel 40 also provides for three output signals (LED's) generated by the monitor 32: a "Weld ON" signal 110, a "25 PSI" signal 112, and a "20 PSI" signal 114. The gas pressure monitor 32 is indicated with the control panel 40 in FIG. 4 as being calibrated in "PSI" (pounds force per square inch), though other units could be employed. If the "Weld ON" signal 110 is illuminated, the gas pressure is within an acceptable range (e.g., 25 to 70 psi (about 0.21 to 0.64 MPa)), the weld voltage on/off control 36 is enabled. The ON/OFF control 36 emits a warning signal and the gas pressure monitor 32 causes the LED signal 112 to be illuminated if a gas pressure at the lower or upper limits of the acceptable range (e.g., 25 psi (about 0.21 MPa)) is detected. At gas pressures sufficiently outside the permitted range (e.g., 20 psi (about 0.18 MPa)), the ON/OFF control 36 shuts down the welding power source 34, and the LED signal 114 is illuminated on the panel 40. As a result, the gas pressure monitor 32 and the ON/OFF control 36 cooperate to avoid circumstances in which an overlay weld must be removed and a weld repeated because of improper gas pressure.

The wire feed motor controller 16 has essentially identical components as the carriage motor controller 14, including the use of feedback from a magnetic encoder 88 (FIGS. 1 and 2) to regulate a wire feed motor 94 that determines the wire feed speed from a wire spool 90 (FIG. 2). Wire feed speed is set with a potentiometer 92 located on the control panel 40 (FIG. 1). The potentiometer 92 may be calibrated in inches per minute, though other units could be used. As with the carriage motor controller 14, the wire feed motor controller 12 is represented in FIG. 1 as comprising a speed and delay controller 96 to enable speed and delays to be set for the wire feed motor 94, a close loop converter 98 that utilizes the feedback from the magnetic encoder 88 to regulate the wire feed rate to the desired value programmed with the potentiometer 92, a motor driver 100 that delivers the drive current to the wire feed motor 94, and an optional status out unit 102 to continuously detect the movement of the spool 90 through the close loop converter 98, and then relay this information to the weld voltage ON/OFF control 36. If wire feed speed is below a preset lower limit to the desired speed, the status output unit 102 sends an "OFF" signal to the ON/OFF control 36, which in turn shuts down the welding power source 34. A wire feed "ON/OFF" switch (not shown) is also preferably provided on the pendant control unit 42.

FIG. 1 shows the controllers 12, 14 and 16, oscillator driver 20 and welding power source 34 as communicating with the data logger 44 for the purpose of monitoring the weld process parameters, enabling evaluation of the weld quality in real time. A suitable sampling rate is about every two minutes, with the ability to collect data over long periods, e.g., about thirty-six days in one working embodiment of the invention. Furthermore, each sample is preferably identified by a time stamp, and total duration for a given weld operation is stored. With this information, an accurate determination can be made of the run time for each operation.

Finally, the weld mode controller 30 controls the sequence of events during the weld cycle, and directly controls the carriage motor controller 14, the wire feed motor controller 16, and the index motor controller 18. A welding cycle is started using an "ALL RUN" switch (not shown) located on the pendant control unit 42, bringing into play various relays and timing circuits to initiate the various control operations in proper sequence. In a preferred sequence, the carriage 50 is initially delayed from movement down the track 52 by the speed and delay controller 60 of the carriage motor controller 14, during which time the speed and delay controller 96 of the wire feed motor controller 16 provides for a low wire feed rate, the torch height controller 12 positions the torch 58 a distance away from the workpiece 51, and the current controller 72 and the voltage controller 74 set the current and voltage output of the welding power source 34 at relatively high levels. Thereafter, the speed and delay controller 60 causes the carriage speed to be stepped up to a speed faster than normal mode, while the wire feed rate, torch height, and weld current and voltage are maintained at the initial settings. After about one-half second, the carriage speed is stepped down to its normal travel speed, and simultaneously the wire feed rate is correspondingly increased and torch height, weld current and voltage are reduced for the balance of the weld cycle. In this manner, the torch height controller 12, the carriage motor controller 14 and the wire feed motor controller 16 cooperate to provide a startup sequence that avoids the occurrence of cold fusion at the beginning of the weld cycle. System mode selector switches (not shown) can be set for vertical or horizontal welding sequences. Though the welding apparatus is intended for operating in a machine welding cycle, the control panel 40 provides a switch 128 that allows for both automatic and manual welding modes.

While the invention has been described in terms of a preferred embodiment, it is apparent that other forms could be adopted by one skilled in the art. Therefore, the scope of the invention is to be limited only by the following claims.

What is claimed is:

1. A welding apparatus comprising:

an electric power source for producing a welding current;

a track;

a welding head carriage adapted for movement on the track;

first feedback means for providing a first feedback signal indicating the travel speed of the weld head carriage on the track;

first control means for controlling the travel speed of the weld head carriage based on the feedback signal from the first feedback means;

an index arm mounted for movement in a direction substantially transverse to the track;

second feedback means for providing a second feedback signal indicating the transverse movement of the index arm;

second control means for controlling the transverse movement of the index arm based on the second feedback signal from the second feedback means;

a slide mounted for movement in a direction substantially transverse to the index arm;

a welding torch mounted to the slide for producing an electric arc from the welding current delivered by the electric power source;

third feedback means for providing a third feedback signal indicating the length of the electric arc produced by the welding torch;

third control means for controlling the length of the electric arc based on the third feedback signal from the third feedback means;

means for dispensing a filler material to the welding torch;

fourth feedback means for providing a fourth feedback signal indicating the rate at which filler material is dispensed by the dispensing means;

fourth control means for controlling the rate at which the filler material is dispensed by the dispensing means based on the fourth feedback signal from the fourth feedback means;

means for shutting down the electric power source based on signals from the first control means, and the second control means; and means for collecting data from the first, third and fourth control means, and the electric power source.

2. A welding apparatus according to claim 1, further comprising:

a first motor controlled by the first control means for causing the welding head carriage to travel on the track;

a second motor controlled by the second control means for causing the index arm to move substantially transverse to the track; and a fourth motor controlled by the fourth control means for causing the dispensing means to dispense the filler material to the welding torch;

wherein the first, second and fourth motors are modules carried with the welding head carriage along the track.

3. A welding apparatus according to claim 1, further comprising a weld head assembly that comprises the welding torch and the slide.

4. A welding apparatus according to claim 3, further comprising a third motor controlled by the third control means for causing the welding torch to move relative to the index arm so as to alter the length of the electric arc, the third motor being a module mounted to the weld head assembly.

5. A welding apparatus according to claim 1, further comprising means for oscillating the welding torch relative to the index arm.

6. A welding apparatus according to claim 5, wherein data collecting means collects data from the oscillating means.

7. A welding apparatus according to claim 1, further comprising means for delivering a shielding gas to the welding torch, and means for sensing the delivery of the shielding gas by the delivering means.

8. A welding apparatus according to claim 7, wherein the shutdown means is further operable to shut down the electric power source based on a signal from the gas sensing means.

9. A welding apparatus according to claim 7, wherein data collecting means collects data from the gas sensing means.

10. A welding apparatus according to claim 1, further comprising a control panel housing the first, second, third and fourth control means, the shutdown means and the data collecting means at a location remote from the welding head carriage, the index arm, the welding torch and the dispensing means.

11. A welding apparatus according to claim 1, further comprising a pendant control unit housing input means for the first, second, third and fourth control means at a location remote from the welding head carriage, the index arm, the welding torch and the dispensing means.

12. A welding apparatus according to claim 1, wherein the first control means comprises means for changing the travel speed of the weld head carriage.

13. A welding apparatus according to claim 1, wherein the third control means comprises means for changing the rate of movement of the slide.

14. A welding apparatus according to claim 1, wherein the fourth control means comprises means for changing the rate at which the filler material is dispensed by the dispensing means.

15. A welding apparatus comprising:

an electric power source for producing a welding current;

a track;

a welding head carriage adapted for movement on the track;

first feedback means for providing a first feedback signal indicating the travel speed of the weld head carriage on the track;

first control means for controlling the travel speed of the weld head carriage based on the feedback signal from the first feedback means;

an index arm mounted for movement in a direction substantially transverse to the track;

second feedback means for providing a second feedback signal indicating the transverse movement of the index arm;

second control means for controlling the transverse movement of the index arm based on the second feedback signal from the second feedback means;

a slide mounted for movement in a direction substantially transverse to the index arm;

a welding torch mounted to the slide for producing an electric arc from the welding current delivered by the electric power source;

third feedback means for providing a third feedback signal indicating the length of the electric arc produced by the welding torch;

third control means for controlling the length of the electric arc based on the third feedback signal from the third feedback means;

means for dispensing a filler material to the welding torch;

fourth feedback means for providing a fourth feedback signal indicating the rate at which filler material is dispensed by the dispensing means;

fourth control means for controlling the rate at which the filler material is dispensed by the dispensing means based on the fourth feedback signal from the fourth feedback means;

means for delivering a shielding gas to the welding torch;

means for sensing the delivery of the shielding gas by the delivering means;

means for oscillating the welding torch relative to the index arm;

means for shutting down the electric power source based on signals from the first control means, the second control means, and the gas sensing means;

means for collecting data from the first, third and fourth control means, the oscillating means, the electric power source, and gas sensing means;

a control panel housing the first, second, third and fourth control means, the delivering means, the gas sensing means, the shutdown means and the data collecting means at a location remote from the welding head carriage, the index arm, the welding torch, the dispensing means and the oscillating means; and a pendant control unit housing input means for the first, second, third and fourth control means and the oscillating means at a location remote from the welding head carriage, the index arm, the welding torch, the dispensing means and the oscillating means.

16. A welding apparatus according to claim 15, further comprising:

a first motor controlled by the first control means for causing the welding head carriage to travel on the track;

a second motor controlled by the second control means for causing the index arm to move substantially transverse to the track; and a fourth motor controlled by the fourth control means for causing the dispensing means to dispense the filler material to the welding torch;

wherein the first, second and fourth motors are modules carried with the welding head carriage along the track.

17. A welding apparatus according to claim 15, further comprising:

a weld head assembly that comprises the welding torch and the slide;

a third motor controlled by the third control means for causing the welding torch to move relative to the index arm so as to alter the length of the electric arc; and a fifth motor controlled by the oscillating means for causing the welding torch to move parallel to the index arm;

wherein the third and fifth motors are modules mounted to the weld head assembly.

18. A welding apparatus according to claim 15, wherein the first control means comprises means for changing the travel speed of the weld head carriage.

19. A welding apparatus according to claim 15, wherein the third control means comprises means for changing the rate of movement of the slide.

20. A welding apparatus according to claim 15, wherein the fourth control means comprises means for changing the rate at which the filler material is dispensed by the dispensing means.

* * * * *

UNITED STATES PATENT AND TRADEMARK OFFICE
CERTIFICATE OF CORRECTION

PATENT NO.     : 6,548,783 B1
DATED          : April 15, 2003
INVENTOR(S)    : Victor Kislovsky and Warren Moss It is certified that error appears in the above-identified patent and that said Letters Patent is hereby corrected as shown below:

<u>Title page,</u>
Item [75], the surname of the first named inventor should be spelled -- Kislovsky --

Signed and Sealed this

Ninth Day of September, 2003

JAMES E. ROGAN
*Director of the United States Patent and Trademark Office*